United States Patent
Lang et al.

(10) Patent No.: US 7,152,626 B1
(45) Date of Patent: Dec. 26, 2006

(54) DIVERTER VALVE

(75) Inventors: Christopher F. Lang, Racine, WI (US);
Chris M. Ford, Brookfield, WI (US);
James Bournoville, Racine, WI (US);
John A. Boticki, Racine, WI (US)

(73) Assignee: JohnsonDiversey, Inc., Sturtevant, WI (US)

( * ) Notice: Subject to any disclaimer, the term of this patent is extended or adjusted under 35 U.S.C. 154(b) by 0 days.

(21) Appl. No.: 11/385,359

(22) Filed: Mar. 21, 2006

(51) Int. Cl.
*F16L 29/00* (2006.01)
(52) U.S. Cl. .................. 137/614.02; 137/614.03; 251/149.1
(58) Field of Classification Search ........... 137/614.02, 137/614.03, 614.04, 614.05; 251/149.1, 251/149.6
See application file for complete search history.

(56) References Cited

U.S. PATENT DOCUMENTS

| 5,560,548 A | * | 10/1996 | Mueller et al. | .......... | 251/149.6 |
| 6,997,181 B1 | * | 2/2006 | Fletcher | ................. | 137/614.04 |

* cited by examiner

*Primary Examiner*—Kevin Lee
(74) *Attorney, Agent, or Firm*—Neil E. Hamilton; James J. Sales; Renee J. Rymarz

(57) ABSTRACT

A fluid diverter valve for attaching a dispensing system to a water source. In a first mode, water flows through the diverter valve to a first outlet which can be a faucet outlet. In a second mode, water is diverted to a fluid conduit which is fastened to a connecting member and a chemical dispenser. The connecting member provides movement of a shuttle valve which directs water n the second mode to the fluid conduit.

13 Claims, 5 Drawing Sheets

DIVERTER VALVE

STATEMENT REGARDING FEDERALLY SPONSORED RESEARCH OR DEVELOPMENT

None

CROSS-REFERENCE TO RELATED APPLICATIONS

None

BACKGROUND OF THE INVENTION

This invention relates generally to a device for connecting a dispenser to a water outlet. More particularly, it relates to a connecting device for attachment to a water faucet wherein the device can divert water from a water outlet to the dispenser.

Diverter valves for connecting spray devices to a shower head are shown in U.S. Pat. No. 5,560,548 and U.S. Pat. No. 5,624,073. A diverter valve for connecting a spray device to a toilet is disclosed in U.S. Pat. No. 6,704,946. These devices are specifically designed for use with a shower head or a toilet. They do not lend themselves for use to connection with a faucet.

There is a need for a diverter valve which can be attached to a faucet in a manner to provide a normal water flow from the faucet and alternatively afford a diversion of water from the faucet to a dispenser. There is also a need for a diverter valve for use with a faucet which can be easily connected and disconnected.

Accordingly, there is a need for an improved diverter valve for use with a water faucet.

The objects of the invention therefore are:

a. Providing an improved diverter valve.

b. Providing a diverter valve especially adapted for use with a faucet.

c. Providing a diverter valve of the foregoing type which is easily connected and disconnected to a dispenser.

d. Providing a diverter valve of the foregoing type which includes a preventive back flow function.

e. Providing a diverter valve of the foregoing type which can be manufactured without special tooling and thus be cost effective.

SUMMARY OF THE INVENTION

The foregoing objects are accomplished and the shortcomings of the prior art are overcome by the diverter valve of this invention for attaching a dispensing system to a water source. The diverter valve includes a valve housing having an annular cavity, a fluid inlet, a first fluid outlet, and a second fluid outlet. The annular cavity allows fluid communication between the fluid inlet, the first fluid outlet and the second fluid outlet. A shuttle valve is slidingly mounted in the annular cavity of the valve housing. There are means for constraining said shuttle valve within the cavity. The shuttle valve is slideable within the annular cavity by water pressure to a first position in which said shuttle valve is seated adjacent the means for constraining the valve such that fluid flows between the fluid inlet and the first fluid outlet. The shuttle valve is slideable within the annular cavity to a second position in which said shuttle valve is positioned in the annular cavity of said valve housing such that fluid flows between the fluid inlet and the second fluid outlet.

In a preferred embodiment, a one-way valve member is positioned in the shuttle valve.

In one aspect, a flow passage is constructed and arranged to permit the passage of water to the first fluid outlet at a slower rate than that when the shuttle valve is moved to the second position to permit the passage of water to the second fluid outlet.

In another aspect, a flexible conduit is fastened to a connecting member opposite the connection to the valve housing and a chemical spray device is connected to the fluid conduit at an end opposite the connection to the connecting member.

In another preferred embodiment, the first fluid outlet is in the form of a faucet outlet.

In still another aspect, a boot member is connected to the fluid inlet for connection to a water faucet.

DESCRIPTION OF THE PREFERRED EMBODIMENT

Figure 1:
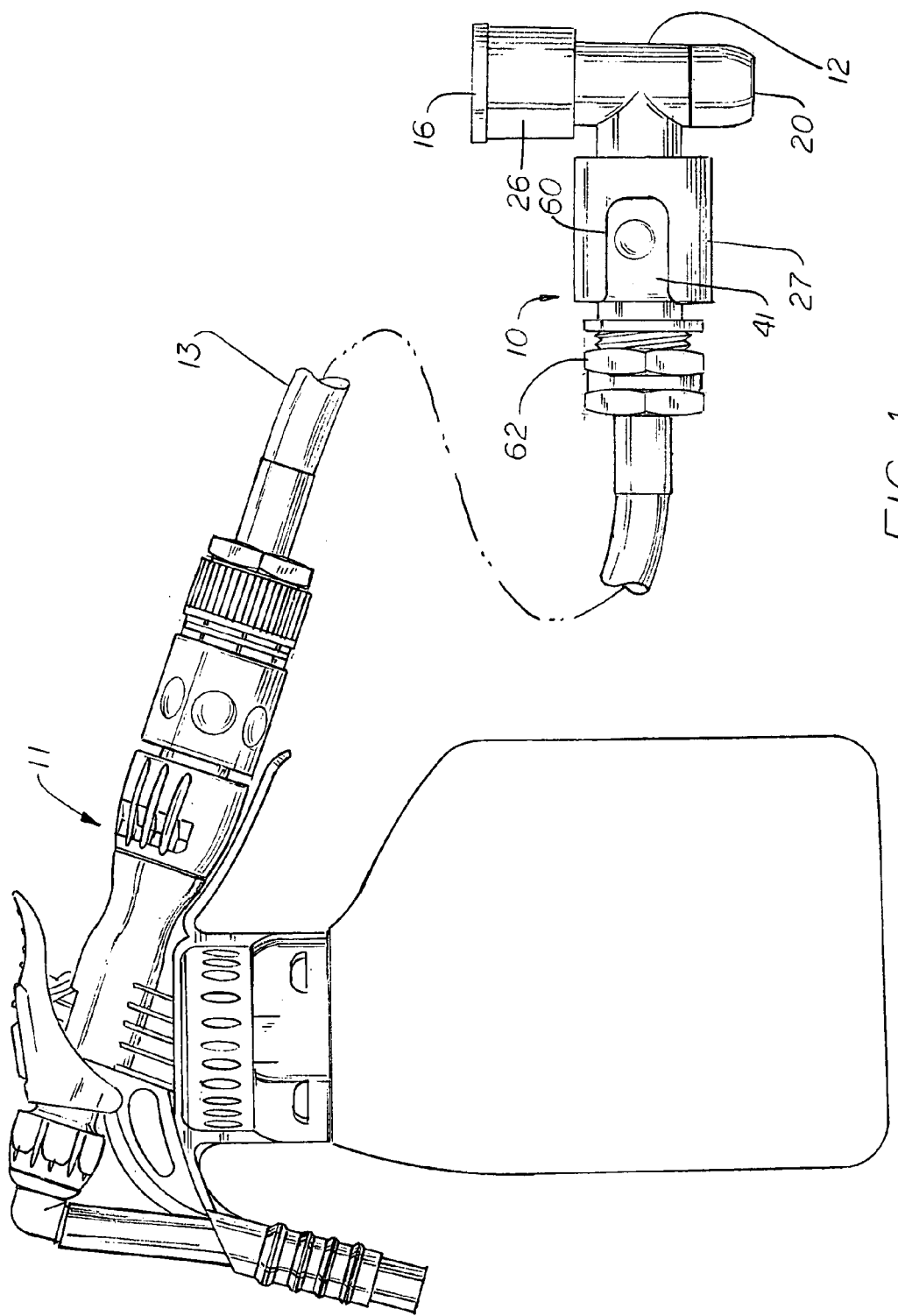
FIG. 1 is a side view showing the diverter valve in conjunction with a multifunction dispenser.

Referring to FIG. 1, the diverter valve generally 10 is shown connected to a Multiple Function Dispenser generally 11 by the hose 13. This preferred dispenser is described in U.S. Pat. No. 6,708,901.

Figure 2:
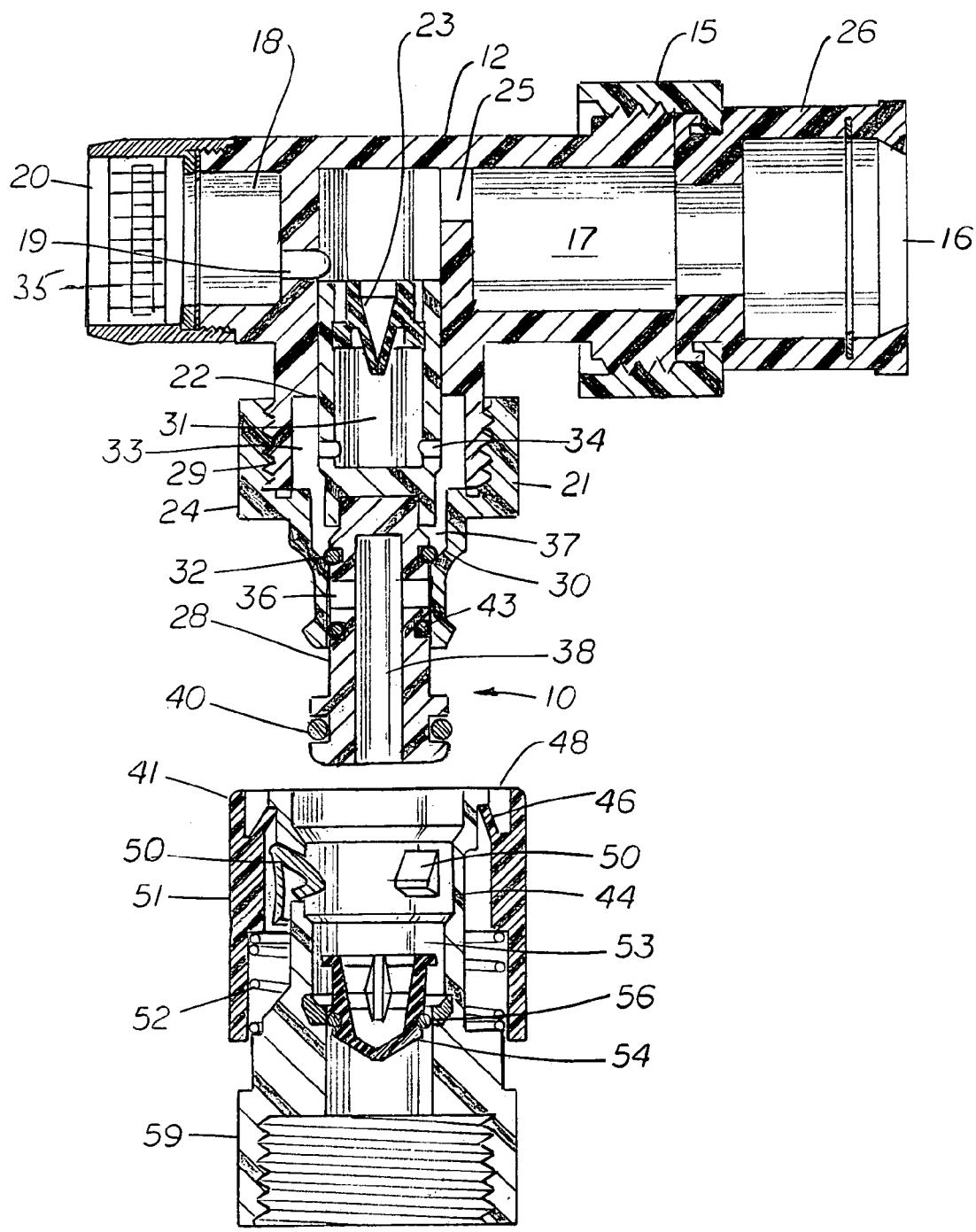
FIG. 2 is a cross-sectional view of one embodiment of the diverter valve in conjunction with a connecting device.
Figure 3:
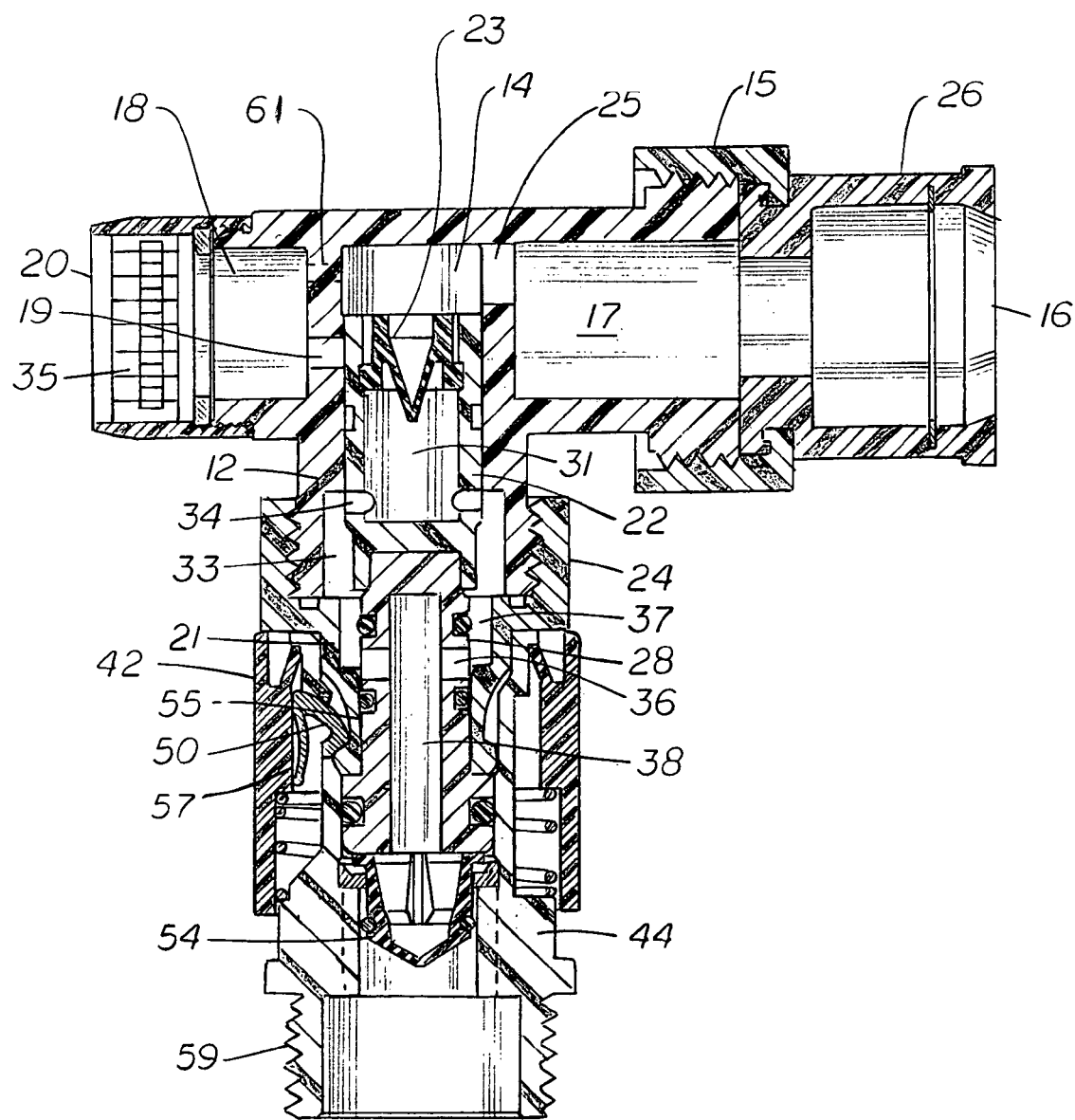
FIG. 3 is a view similar to FIG. 2 showing the connecting device engaging the diverter valve and the diverter valve in a diverting position.

As shown in FIGS. 2–3, diverter valve 10 includes a valve housing 12 with an annular cavity 14. A fluid inlet passage 16 is provided by a boot-type connection 26 which is connected to a housing 12 by the threaded connector 15. There is a cavity 18 in fluid communication with inlet passage 16 by means of passages 19 and 25, which conveys fluid to outlet 20. Slideably positioned in annular cavity 14 is a shuttle valve 22. A one-way valve 23 is positioned in valve 22, which has a cavity portion 31. Shuttle valve 22 is in contact with valve actuating member 28 having a seal 32 for contact with shoulder 30 in housing member 21. Additional seals 40 and 43 are also provided on actuating member 28.

A Gardena connecting device in the form of a quick connect-disconnect coupling part is shown at 41. It is readily available from Gardena Manufacturing GmbH. It comprises an outer sleeve 42 and an inner retaining collar 44 with an annulus portion 48 for retentive contact with tabs 46 extending from outer sleeve 42. There are locking elements 50 pivotally attached to retaining collar 44 and extending through apertures 51. A spring 52 biases the tabs 46 of outer sleeve 42 against the annulus portion 48. A one-way valve 54 is disposed in the central passageway 53 of the coupling part 41. A seal is provided at 56.

Figure 4:
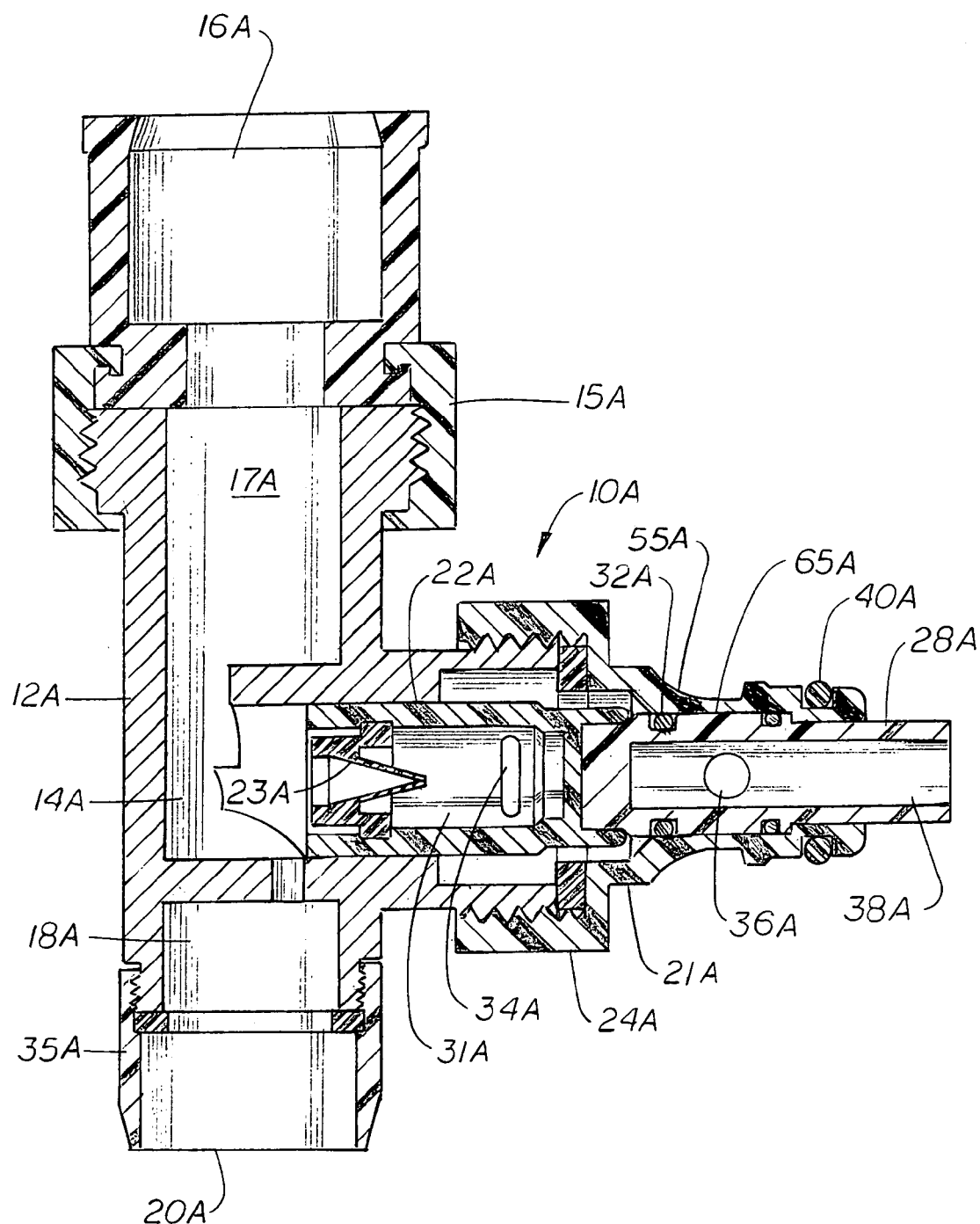
FIG. 4 is a cross-sectional view of an alternative embodiment of the diverter valve.
Figure 5:
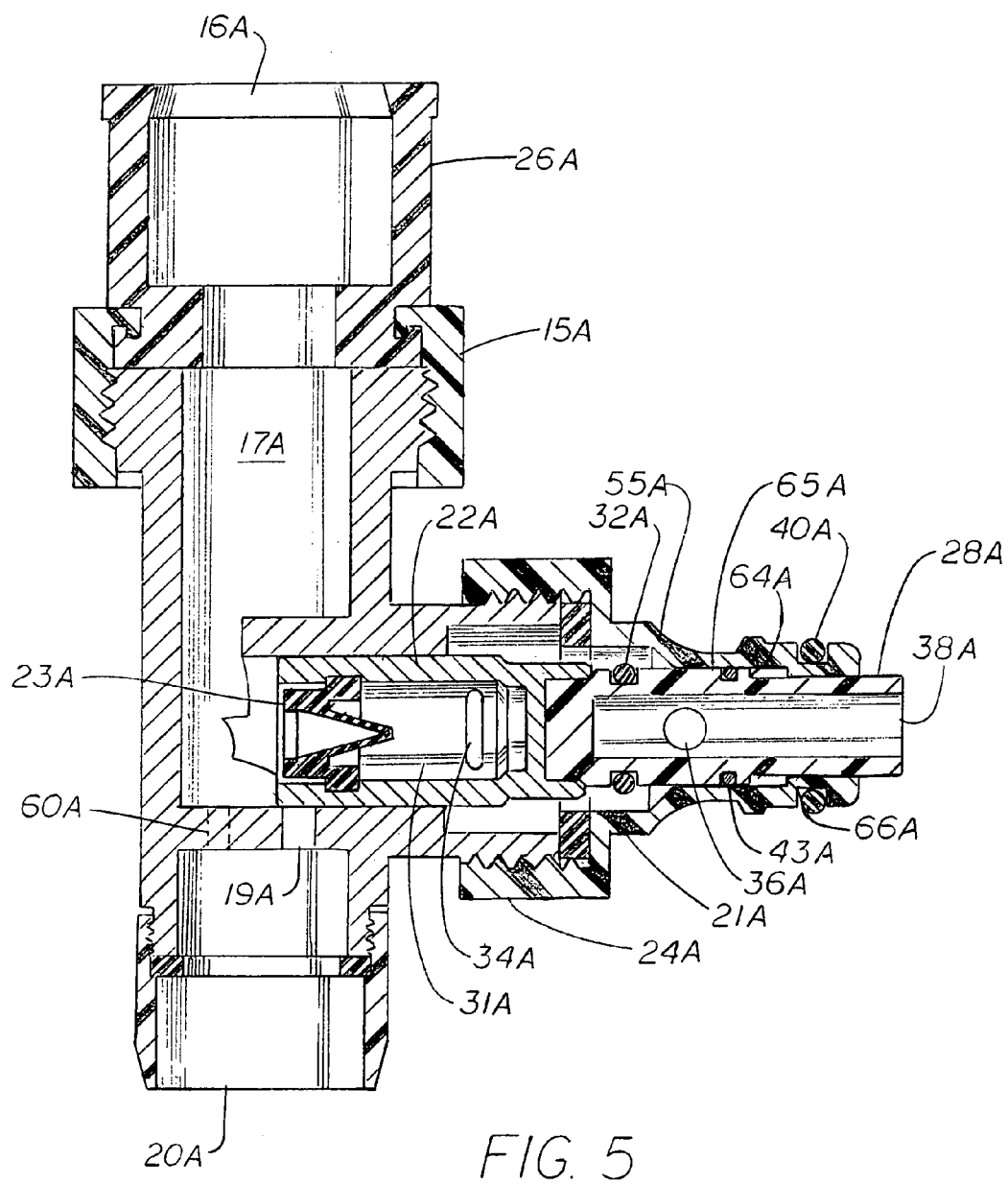
FIG. 5 is a view similar to FIG. 4 showing the diverter valve in a diverting position.

FIGS. 4 and 5 show an alternative embodiment 10A with similar components referenced by the same numerals except followed by the "A" suffix. The difference between embodiment 10 and 10A is positioning of the O-ring seal 40A which is placed on housing member 21A in embodiment 10A. In contrast O-ring seal 40 is placed on actuating member 28 in embodiment 10.

OPERATION

A better understanding of diverter valves 10 and 10A will be had by a description of their operation. Referring to FIGS. 1–3, diverter valve 10 is connected to a water faucet (not shown) by means of the fluid inlet passage 16 in the form of a boot 26. Although not shown in FIG. 2, the slotted shield 27 would be attached to connecting member 24 which in turn is connected to valve housing 12 by threads 29. Slotted shield 27 will extend over actuating member 28 as positioned in FIG. 2. Water flows into cavity 17, through passage 25, into cavity 14, through passage 19 and out through cavity 18. Water pressure in cavity 14 acts against valve 23 and shuttle valve 22 to move it and actuating member 28 to the position shown in FIG. 2. In this position, shuttle valve 22 is restrained from further movement by seal 32 engaging shoulder 30. This movement of shuttle valve 22 is effected by designing valve 23 with a cracking point such that it will permit shuttle valve 22 to move in the previously described manner without water passing through valve 23.

When it is desired to dispense product from dispenser 11 as seen in FIG. 1, the Gardena coupling part 41 is moved over actuating member 28 and a portion of housing member 21 until the Gardena coupling part 41 engages connecting member 24 of housing member 21. At the same time flexible locking elements 50 engage the reduced diameter section 55 of housing member 21. The movement of locking elements 50 onto the reduced diameter section 55 is effected by the flange 57 moving against them. This is illustrated in FIG. 3. In this position, actuating member 28 contacts valve 54 to open it and moves shuttle valve 22 to the position shown in FIG. 3. In this position, it is seen that shuttle valve 22 covers passage 19. This causes all of the pressurized water to flow through valve 23 and into cavity 31. From there, water passes through orifice 34 into a passage 33 between valve 22 and valve housing member 12, into cavity 37, then into orifice 36, into passage 38, through valve 54 and into hose 13 through coupling 62 which connects to threaded portion 59 of retaining collar 44.

When it is no longer desired to dispense product from dispenser 11, the Gardena coupling part 41 is grasped on opposing sides through slots such as 60 on slotted shield 27 and pulled in a direction away from valve housing 12. This is best seen in FIG. 1. This pulling action releases the contact of flanges 57 with locking elements 50 and allows movement of the locking elements 50 out of the reduced diameter section 55 as well as the movement of coupling part 41 away from the valve housing 12 and the actuating member 28. Water pressure acting against shuttle valve 22 and valve 23 can then move shuttle valve 22 to the position shown in FIG. 2. This movement of shuttle valve 22 is effected by the predetermined cracking point of valve 23. Water then flows through passage 19, cavity 18 and aerator 35 as in its normal position. Aerator 35 causes a slower flow rate through outlet 20 when the diverter valve 10 is in a non-diverting position shown in FIG. 2, than when in the diverting position shown in FIG. 3. The small amount of back pressure caused by the aerator acts on valve 23 and assists in moving shuttle valve to the non-diverting position.

The operation of embodiment 10A is substantially the same as previously described for embodiment 10. One difference is the seal 40A which will be provided between the coupling part 41 and the housing member 21A. It will be recognized that seal 40A is placed on housing member 21A and not on actuating member 28A as is seal 40 on actuating member 28. The sealing between housing member 21A and coupling part 41 is effected in a manner as visualized in FIG. 3. Another difference is the engagement of flange portion 64A with shoulder 66A to limit movement of valve actuating member 28A in housing member 21A as it slides in barrel 65A.

Referring to FIG. 3 there is shown in phantom lines an additional passage 61 between cavities 14 and 18. This offers a minimum amount of water flow to outlet 20 even when the major portion of water is being diverted. Some plumbing codes require this as a means of preventing cross-over of hot and cold water supplies.

An important aspect of embodiments 10 and 10A is the use of one-way valves 23 and 23A to move shuttle valves 22 and 22A in conjunction with a predetermined water pressure. The one-way valves 23 and 23A thus serve the dual function of moving the respective shuttle valves 22 and 22A in conjunction with a predetermined water pressure but also serving as back-check valves.

It will thus be seen there is now provided a diverter valve which offers a quick-connect and disconnect with a water source. The diverter valve is activated by coupling part which is readily available in the market place, thus reducing design and components costs. The dispenser valve also provides a flow-through type bleeder slot 60 that reminds users to turn off the water when the dispenser 11 is no long being used and also relieves water pressure on a faucet when water is diverted. In addition, the one-way valve 54 in the Gardena coupling part 41 serves to prevent the discharge of water from hose 13 when it is disconnected from dispenser 11.

Another important aspect is in providing a diverter valve which obviates the need for a spring. This reduces maintenance costs due to faulty springs.

The preferred material for composing valve housing 12 and shuttle valve 22 is glass filled polypropylene. However, other plastic materials and metals can be employed. For example, acetyls and polycarbonates, as well as brass and aluminum.

The diverter valves 10 and 10A have been described for use with a particular connect-disconnect coupling part 41. It will be appreciated any such coupling part could be employed which provides movement of the actuating members 28 and 28A of the shuttle valves 22 and 22A, respectively. Neither is it essential that the diverter valves 10 and 10A being employed with a particular dispenser 11. They can be utilized in conjunction with any liquid dispensing device or apparatus. Slotted shield 27 could be eliminated. However, it does reduce accidental contact with actuating members 28 and 28A when extended from housing members 21 and 21A, respectively. A boot connector 26 has been described for connection to a water faucet. If desired, a commonly employed screw connector could be utilized. All such and other modifications within the spirit of the invention are meant to be within its scope as defined by the appended claims.

What is claimed is:

1. A diverter valve for attaching a dispensing system to a water source, said diverter valve comprising:
   a. a valve housing having an annular cavity defined within said valve housing, a fluid inlet, a first fluid outlet, and a second fluid outlet, wherein the annular cavity allows fluid communication between the fluid inlet, the first fluid outlet and the second fluid outlet;

b. a shuttle valve slidingly mounted in the annular cavity of said valve housing;

c. means for constraining said shuttle valve within said cavity;

d. said shuttle valve constructed and arranged to be slideable within the annular cavity by water pressure to a first position in which said shuttle valve is seated adjacent said means for constraining said valve such that fluid flows between the fluid inlet and the first fluid outlet; and e. said shuttle valve is slideable within the annular cavity to a second position in which said shuttle valve is positioned in the annular cavity of said valve housing such that fluid flows between the fluid inlet and the second fluid outlet.

2. The diverter valve as defined in claim 1 further including a one way valve member positioned in the shuttle valve.

3. The diverter valve as defined in claim 1 including a flow passage constructed and arranged to permit the passage of water to the first fluid outlet at a slower rate than that when the shuttle valve is moved to the second position to permit the passage of water to the second fluid outlet.

4. The diverter valve as defined in claim 1 further including a connecting member constructed and arranged to be connected to the valve housing and to move the shuttle valve to the second position.

5. The diverter valve as defined in claim 4 wherein the connecting member includes an actuating member to move the valve to the second position.

6. The diverter valve as defined in claim 4 wherein the connecting member is constructed and arranged to provide a push connection and a pull disconnection.

7. The diverter valve as defined in claim 6 wherein the connecting member includes a one-way valve.

8. The diverter valve as defined in claim 7 wherein the one-way valve is opened by a shuttle valve actuating member.

9. The diverter valve as defined in claim 6 further including a flexible conduit member fastened to the connecting member opposite the connection to the valve housing.

10. The diverter valve as defined in claim 9 further including a chemical spray device connected to the fluid conduit at an end opposite the connection to the connecting member.

11. The diverter valve as defined in claim 10 wherein the connecting member is a hollow stem member.

12. The diverter valve as defined in claim 1 wherein the first fluid outlet is constructed and arranged as a faucet outlet.

13. The diverter valve as defined in claim 1 wherein a boot member is connected to the fluid inlet for connection to a water faucet.

* * * * *